(12) United States Patent
Steer et al.

(10) Patent No.: US 8,519,889 B2
(45) Date of Patent: Aug. 27, 2013

(54) METHOD AND APPARATUS FOR ESTIMATING LOCATION OF A WIRELESS STATION USING MULTI-BEAM TRANSMISSION

(75) Inventors: David Steer, Nepean (CA); Scott Widdowson, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/506,692

(22) Filed: Jul. 21, 2009

(65) Prior Publication Data

US 2011/0018766 A1 Jan. 27, 2011

(51) Int. Cl.
*G01S 1/44* (2006.01)
*G01S 5/04* (2006.01)

(52) U.S. Cl.
USPC ............................................ 342/398; 342/432

(58) Field of Classification Search
USPC ............... 342/398, 408, 432–436, 414, 415; 455/277.1, 277.2, 456.1, 456.5, 456.6
See application file for complete search history.

(56) References Cited

U.S. PATENT DOCUMENTS

| | | | | |
|---|---|---|---|---|
| 2,509,207 A | * | 5/1950 | Busignies | 342/149 |
| 4,062,015 A | * | 12/1977 | Litva et al. | 342/434 |
| 6,195,556 B1 | | 2/2001 | Reudink et al. | |
| 6,236,849 B1 | * | 5/2001 | Reudink et al. | 455/342 |
| 6,850,761 B2 | * | 2/2005 | Pallonen | 455/437 |
| 7,053,829 B2 | * | 5/2006 | Krause et al. | 342/398 |
| 7,130,663 B2 | * | 10/2006 | Guo | 455/562.1 |
| 7,313,403 B2 | * | 12/2007 | Gong et al. | 455/456.1 |

FOREIGN PATENT DOCUMENTS

| | | |
|---|---|---|
| WO | 02/15432 | 2/2002 |
| WO | 03058272 A1 | 7/2003 |

OTHER PUBLICATIONS

Extended European Search Report for European Patent Application No. 10170114.2, Dec. 19, 2011, 6 pages.
Office Action issued in U.S. Appl. No. 13/620,585 on Dec. 10, 2012; 9 pages.
Communication Pursuant to Article 94(3) EPC issued in EP Application No. 10170114.2 on Mar. 25, 2013; 5 pages.

* cited by examiner

*Primary Examiner* — Cassie Galt
(74) *Attorney, Agent, or Firm* — Fish & Richardson P.C.

(57) ABSTRACT

A method and apparatus for estimating location of wireless stations in a wireless communication network are provided. An estimation of a bearing angle of a wireless station from a reference point of a multi-beam antenna pattern is made based on a plurality of beaming angles of a multi-beam antenna pattern and a received signal property, at the wireless station, of each of a plurality of wireless signals transmitted on respective beams of the multi-beam antenna pattern for each of the plurality of beaming angles.

16 Claims, 8 Drawing Sheets

METHOD AND APPARATUS FOR ESTIMATING LOCATION OF A WIRELESS STATION USING MULTI-BEAM TRANSMISSION

FIELD OF THE INVENTION

The invention relates to wireless communication, and more specifically to methods and systems for determining the location of a wireless station.

BACKGROUND OF THE INVENTION

Conventional techniques for wirelessly determining the location of wireless stations within a wireless communication network, such as receiving the Global Positioning System (GPS) signal from satellite radio transmissions, are often ineffective in many locations due to the weakness of the signals received and the effects of multipath signal propagation, particularly indoors and in "urban canyons" created by tall buildings, where radio signals are typically scattered by multiple objects in the environment. Such multipath scattering thwarts many conventional location techniques due to the multiple signals arriving at the terminals and network access points, e.g. base stations.

Other conventional location techniques, such as measuring the strength or time-of-arrival of signals (or differences in arrival time among multiple signals) from terrestrial transmitters are also confused by the multipath propagation and require specialized measuring apparatus in the wireless stations.

As a result, communications systems employing conventional location techniques are typically expensive, as specialized receivers or signal measuring apparatus is implemented in each wireless station. The additional reception and measurements at the wireless stations also consume additional power and consequently reduce battery lifetime. Reception of the GPS signals, for example, requires an additional antenna and receiver in a wireless station, which increases the size and weight of the station.

SUMMARY

According to one broad aspect, the invention provides a method comprising: estimating a bearing angle from a reference point of a multi-beam antenna pattern to a wireless station based on a plurality of beaming angles of the multi-beam antenna pattern and a received signal property, at the wireless station, of each of a plurality of wireless signals transmitted on respective beams of the multi-beam antenna pattern for each of the plurality of beaming angles.

In some embodiments, the method further comprises: for each of the plurality of beaming angles of the multi-beam antenna pattern, transmitting each wireless signal of the respective plurality of wireless signals on a respective beam of the multi-beam antenna pattern.

In some embodiments, the method further comprises: steering a beam of the multi-beam antenna pattern toward the wireless station for communication with the wireless station based on the estimated bearing angle of the wireless station.

In some embodiments, estimating a bearing angle from a reference point of the multi-beam antenna pattern to the wireless station comprises determining a beaming angle at which a ratio of the respective received signal property of at least two of the wireless signals transmitted on respective antenna beams of the multi-beam antenna pattern is substantially equal to a predetermined value.

In some embodiments, for each of the plurality of wireless signals transmitted on the respective beams of the multi-beam antenna pattern, the received signal property at the wireless station comprises a received level of a component of the wireless signal transmitted on the respective beam that is distinct from the wireless signals transmitted on the other beams of the multi-beam antenna pattern.

In some embodiments, the predetermined value is substantially equal to one.

In some embodiments: the multi-beam antenna pattern comprises a first antenna beam and a second antenna beam; and estimating the bearing angle comprises determining a beaming angle at which a ratio of the received signal property of the respective wireless signal transmitted on the first antenna beam to the received signal property of the respective wireless signal transmitted on the second antenna beam is substantially equal to the predetermined value.

In some embodiments: the multi-beam antenna pattern comprises a third antenna beam intermediate the first antenna beam and the second antenna beam; and estimating the bearing angle comprises determining a beaming angle at which: a ratio of the received signal property of the respective wireless signal transmitted on the first antenna beam to the received signal property of the respective wireless signal transmitted on the third antenna beam is substantially equal to a second predetermined value; and a ratio of the received signal property of the respective wireless signal transmitted on the second antenna beam to the received signal property of the respective wireless signal transmitted on the third antenna beam is substantially equal to a third predetermined value.

In some embodiments, the third antenna beam is substantially half-way between the first antenna beam and the second antenna beam, and the second predetermined value is substantially equal to the third predetermined value.

In some embodiments, the method further comprises: for each beaming angle, transmitting, to the wireless station, a code representative of the beaming angle.

In some embodiments, the method further comprises: receiving, from the wireless station, the code representative of the beaming angle at which the ratio of the respective received signal property of at least two of the wireless signals transmitted on respective antenna beams of the multi-beam antenna pattern is substantially equal to the predetermined value.

In some embodiments, the plurality of wireless signals comprises any one of: orthogonal frequency division multiplex (OFDM) signals; code division multiple access (CDMA) signals; time division multiple access (TDMA) signals; and pulse-based ultra wideband (UWB) signals.

In some embodiments: the plurality of wireless signals comprises orthogonal frequency division multiplex (OFDM) signals; the distinct component of the respective wireless signal of each beam comprises at least one subcarrier that is distinct from the subcarriers transmitted on the other beams; and the ratio of the received level of the distinct components of at least two of the beams of the multi-beam antenna pattern comprises a ratio between the received signal powers at the wireless station of the distinct subcarriers of the at least two beams of the multi-beam antenna pattern.

In some embodiments: the plurality of wireless signals comprises code division multiple access (CDMA) signals; the distinct component of the respective wireless signal of each beam comprises a respective portion of a preamble at the beginning of a transmission burst, such that each antenna beam of the multi-beam antenna pattern transmits during its respective portion of the preamble; and the ratio of the received level of the distinct components of at least two of the beams of the multi-beam antenna pattern comprises a ratio between the received signal powers at the wireless station of the respective portions of the preamble.

In some embodiments: the plurality of wireless signals comprises code division multiple access (CDMA) signals, such that for each beaming angle the same wireless signal is transmitted on each antenna beam of the multi-beam antenna pattern with a timing offset between beams to allow the wireless signal on each antenna beam to be received and resolved at the wireless station into a distinct component; and the ratio of the received level of the distinct components of at least two of the beams of the multi-beam antenna pattern comprises a ratio between the received signal power of the received and resolved time offset CDMA signals transmitted on the at least two beams of the multi-beam antenna pattern.

In some embodiments: the plurality of wireless signals comprises time division multiple access (TDMA) signals; the distinct component of the respective wireless signal of each beam comprises a respective portion of a preamble of a frame, such that each antenna beam of the multi-beam antenna pattern transmits during its respective portion of the preamble of the frame; and the ratio of the received level of the distinct components of at least two of the beams of the multi-beam antenna pattern comprises a ratio between the received signal powers at the wireless station of the respective portions of the preamble of the frame.

In some embodiments: the plurality of wireless signals comprises pulse-based ultra wideband (UWB) signals; the distinct component of the respective wireless signal of each beam comprises a subset of a plurality of UWB pulses, such that each beam of the multi-beam antenna transmits a respective subset of the plurality of UWB pulses; and the ratio of the received level of the distinct components of at least two of the beams of the multi-beam antenna pattern comprises a ratio between the received signal powers at the wireless station of the respective subsets of UWB pulses transmitted on the at least two beams of the multi-beam antenna pattern.

In some embodiments, the method further comprises: for each of at least one additional multi-beam antenna pattern: for each of a plurality of beaming angles of the additional multi-beam antenna pattern, transmitting a plurality of wireless signals on respective antenna beams of the additional multi-beam antenna pattern; and estimating a bearing angle from a reference point of the additional multi-beam antenna pattern to the wireless station based on a received signal property, at the wireless station, of each of the plurality of wireless signals transmitted on the respective beams of the additional multi-beam antenna pattern for each of the plurality of beaming angles of the additional multi-beam antenna pattern.

In some embodiments, the method further comprises: estimating a location of the wireless station based on a location of intersection of the estimated bearing angle of the wireless station from the reference point of the first multi-beam antenna pattern and the respective estimated bearing angles of the wireless station from the respective reference points of each of the at least one additional multi-beam antenna pattern.

In some embodiments, estimating the location of the wireless station is determined based on the location of intersection of the estimated bearing angles of the wireless station from the plurality of multi-beam antenna patterns and hyperbolas representing the estimated radial distances between the wireless station and the respective reference points of at least a subset of the plurality of multi-beam antenna patterns.

In some embodiments, the method further comprises: for each beaming angle, receiving a code representative of the beaming angle.

In some embodiments, the method further comprises: reporting the code representative of the beaming angle at which the ratio of the respective received signal property of at least two of the wireless signals transmitted on respective antenna beams of the multi-beam antenna pattern is substantially equal to the predetermined value.

In some embodiments, the method further comprises: estimating a location of the wireless station based on a location of intersection of the estimated bearing angle of the wireless station from the reference point of the first multi-beam antenna pattern and a respective estimated bearing angle of the wireless station from a respective reference point of each of at least one additional multi-beam antenna pattern.

According to another broad aspect of the present invention, there is provided an apparatus comprising: a multi-beam antenna system configured to generate a multi-beam antenna pattern; a beam steerer configured to steer the multi-beam antenna system to a plurality of beaming angles; a radio frequency (RF) transmitter configured to generate a plurality of wireless signals at each beaming angle of the plurality of beaming angles, such that at each beaming angle, each wireless signal of the plurality of wireless signals is transmitted on a respective one of the antenna beams of the multi-beam antenna pattern generated by the multi-beam antenna system; and a location estimation controller configured to estimate a bearing angle from a reference point of the multi-beam antenna pattern to a wireless station based on the plurality of beaming angles and a received signal property, measured at the wireless station, of each of the plurality of wireless signals transmitted on the respective antenna beams of the multi-beam antenna pattern for each of the plurality of beaming angles.

In some embodiments, the location estimation controller is configured to receive the received signal property of each of the plurality of wireless signals for each of the plurality of beaming angles from the wireless station.

In some embodiments, the location estimation controller is configured to estimate a bearing angle from a reference point of the multi-beam antenna pattern to the wireless station by determining a beaming angle at which a ratio of the respective received signal property of at least two of the wireless signals transmitted on respective antenna beams of the multi-beam antenna pattern is substantially equal to a predetermined value.

In some embodiments, the RF transmitter is configured to transmit a code representative of a current beaming angle of the plurality of beaming angles for each of the plurality of beaming angles.

In some embodiments, the location estimation controller is configured to receive, from the wireless station, the code representative of the beaming angle at which the ratio of the respective received signal property of at least two of the wireless signals transmitted on respective antenna beams of the multi-beam antenna pattern is substantially equal to the predetermined value.

In some embodiments, the location estimation controller is configured to control the beam steerer to steer a beam of the multi-beam antenna pattern toward the wireless station for communication with the wireless station based on the estimated bearing angle of the wireless station.

In some embodiments, the location estimation controller is configured to control the RF transmitter to generate the plurality of wireless signals for each of the plurality of beaming angles such that each wireless signal of the plurality of wireless signals generated for each beaming angle includes at least one component that is distinct from the other wireless signals of the plurality of wireless signals generated for the same beaming angle.

In some embodiments, the location estimation controller is configured to perform a calibration algorithm to determine the predetermined value.

In some embodiments, the predetermined value is substantially equal to one.

In some embodiments: the multi-beam antenna system is configured such that the multi-beam antenna pattern comprises a first antenna beam and a second antenna beam; and the location estimation controller is configured to estimate the bearing angle by determining a beaming angle at which a ratio of the received signal property of the respective wireless signal transmitted on the first antenna beam to the received signal property of the respective wireless signal transmitted on the second antenna beam is substantially equal to the predetermined value.

In some embodiments, the first antenna beam and the second antenna beam are separated by substantially 90°.

In some embodiments: the multi-beam antenna system is configured such that the multi-beam antenna pattern comprises a third antenna beam intermediate the first antenna beam and the second antenna beam; and the location estimation controller is configured to estimate the bearing angle by determining a beaming angle at which: a ratio of the received signal property of the respective wireless signal transmitted on the first antenna beam to the received signal property of the respective wireless signal transmitted on the third antenna beam is substantially equal to a second predetermined value; and a ratio of the received signal property of the respective wireless signal transmitted on the second antenna beam to the received signal property of the respective wireless signal transmitted on the third antenna beam is substantially equal to a third predetermined value.

In some embodiments, the multi-beam antenna system is configured such that the third antenna beam is substantially half-way between the first antenna beam and the second antenna beam, and the second predetermined value is substantially equal to the third predetermined value.

In some embodiments, the location estimation controller is configured to: estimate a radial distance between the wireless station and the reference point of the multi-beam antenna pattern based on at least one of received signal strength and timing synchronization information from the wireless station; and estimate a location of the wireless station based on the estimated bearing angle of the wireless station from the reference point of the multi-beam antenna pattern and the estimated radial distance between the reference point of the multi-beam antenna pattern and the wireless station.

In some embodiments: for each beaming angle, the RF transmitter is configured to generate a plurality of time offset versions of a code division multiple access (CDMA) signals as the plurality of wireless signals to allow the wireless signal transmitted on each antenna beam of the multi-beam antenna pattern to be received and resolved at the wireless station into a distinct component.

In some embodiments, the apparatus further comprises: a second multi-beam antenna system configured to generate a second multi-beam antenna pattern, wherein the multi-beam antenna systems are located in different locations; a second beam steerer configured to steer the second multi-beam antenna system to a second plurality of beaming angles; a second radio frequency (RF) transmitter configured to generate a second plurality of wireless signals at each beaming angle of the second plurality of beaming angles, such that at each beaming angle of the second plurality of beaming angles, each wireless signal of the second plurality of wireless signals is transmitted on a respective one of the antenna beams of the second multi-beam antenna pattern generated by the second multi-beam antenna system, wherein the location estimation controller is configured to estimate a bearing angle from a reference point of the second multi-beam antenna pattern to the wireless station based on the second plurality of beaming angles and a received signal property, measured at the wireless station, of each of the second plurality of wireless signals transmitted on the respective antenna beams of the second multi-beam antenna pattern for each of the plurality of beaming angles of the second plurality of beaming angles.

In some embodiments, the location estimation controller is configured to estimate a location of the wireless station based on a location of intersection of the estimated bearing angle of the wireless station from the reference point of the first multi-beam antenna pattern and the estimated bearing angle of the wireless station from the reference point of the second multi-beam antenna pattern.

In some embodiments, the location estimation controller is configured to estimate: a radial distance from the wireless station to the reference point of the first multi-beam antenna pattern; and a radial distance from the wireless station to the reference point of the second multi-beam antenna pattern, based on at least one of received signal strength and timing synchronization information.

In some embodiments, the location estimation controller is configured to estimate the location of the wireless station based on the location of intersection of the estimated bearing angles of the wireless station from the respective reference points of the first and second multi-beam antenna patterns and hyperbolas representing the estimated radial distances between the wireless station and the respective reference points of the first and second multi-beam antenna patterns.

In some embodiments: the first multi-beam antenna system and the second multi-beam antenna system are located at different elevations; and the location estimation controller is configured to estimate an elevation of the wireless station based on the estimated bearing angles and the estimated radial distances of the wireless station relative to the reference points of the plurality of multi-beam antenna patterns and the elevations of the first and second multi-beam antenna systems.

In some embodiments, the apparatus further comprises: an access controller configured to control access of a wireless station to wireless communication system resources based on the estimated location of the wireless station.

In some embodiments, the apparatus is located in an access point of a wireless communication system.

According to yet another broad aspect of the present application, there is provided a method comprising: transmitting a plurality of wireless signals, each wireless signal being transmitted on a respective beam of a multi-beam antenna pattern; and estimating a bearing angle from a reference point of the multi-beam antenna pattern to a wireless station based on a received signal property, at the wireless station, of the plurality of wireless signals transmitted on the respective beams of the multi-beam antenna pattern.

In some embodiments, the method further comprises: receiving, from the wireless station, the received signal property of each of the plurality of wireless signals transmitted on the respective beams of the multi-beam antenna pattern.

In some embodiments, the method further comprises performing a calibration to determine the predetermined value.

In some embodiments, the method further comprises: estimating a radial distance between the wireless station and the reference point of the multi-beam antenna pattern; and estimating a location of the wireless station based on the estimated bearing angle of the wireless station from the reference point of the multi-beam antenna pattern and the estimated radial distance between the reference point of the multi-beam antenna pattern and the wireless station.

In some embodiments, estimating the radial distance between the wireless station and the reference point of the multi-beam antenna pattern is based on at least one of: received signal strength; and timing synchronization information.

In some embodiments, the ratio between the received signal powers at the wireless station of the distinct subcarriers of the at least two beams of the multi-beam antenna pattern comprises a ratio of the received signal powers of adjacent pairs of subcarriers.

In some embodiments: the plurality of wireless signals comprises code division multiple access (CDMA) signals; the distinct component of the respective wireless signal of each beam comprises a portion of a signal spread with a respective distinct spreading code, such that each beam of the multi-beam antenna transmits the portion of the signal spread with its respective distinct spreading code; and the ratio of the received power level of the distinct components of at least two of the beams of the multi-beam antenna pattern comprises a ratio between the received signal powers at the wireless station of the respective spreading codes.

In some embodiments: the plurality of wireless signals comprises time division multiple access (TDMA) signals; the distinct component of the respective wireless signal of each beam comprises a respective TDMA time slot, such that each beam of the multi-beam antenna transmits in it respective TDMA time slot; and the ratio of the received power level of the distinct components of at least two of the beams of the multi-beam antenna pattern comprises a ratio between the received signal powers at the wireless station in the respective TDMA time slots of the at least two beams of the multi-beam antenna pattern.

In some embodiments, the method further comprises: estimating a radial distance from the wireless station to at least one of the respective reference points of the plurality of multi-beam antenna patterns based on at least one of: received signal strength; and timing synchronization at the wireless station.

In some embodiments, estimating the location of the wireless station is determined based on the location of intersection of the estimated bearing angles of the wireless station from the plurality of multi-beam antenna patterns and hyperbolas representing the estimated radial distances between the wireless station and the respective reference points of at least a subset of the plurality of multi-beam antenna patterns.

In some embodiments: the plurality of multi-beam antenna patterns are not all located at the same elevation; and estimating a location of the wireless station comprises estimating an elevation of the wireless station based on the estimated bearing angles and the estimated radial distances of the wireless station relative to the reference points of the plurality of multi-beam antenna patterns and the elevations of the plurality of multi-beam antenna patterns.

In some embodiments, the method further comprises: controlling access of a wireless station to wireless communication system resources based on the estimated location of the wireless station and identification information associated with the wireless terminal.

According to still another broad aspect of the present application, there is provided a method in a wireless station, the method comprising: for each of a plurality of beaming angles of a multi-beam antenna pattern, receiving a respective plurality of wireless signals, each wireless signal having been transmitted on a respective beam of the multi-beam antenna pattern; and estimating a bearing angle from a reference point of the multi-beam antenna pattern to the wireless station based on a received signal property, at the wireless station, of each of the plurality of wireless signals transmitted on the respective beams of the multi-beam antenna pattern for each of the plurality of beaming angles.

In some embodiments, the method further comprises: transmitting, from the wireless station, the received signal property of each of the plurality of wireless signals transmitted on the respective beams of the multi-beam antenna pattern for each of the plurality of beaming angles.

In some embodiments: the multi-beam antenna pattern comprises a third antenna beam intermediate the first antenna beam and the second antenna beam; and estimating the bearing angle comprises determining a beaming angle at which: a ratio of the received signal property of the respective wireless signal transmitted on the first antenna beam to the received signal property of the respective wireless signal transmitted on the third antenna beam is substantially equal to a second predetermined value; and a ratio of the received signal property of the respective wireless signal transmitted on the second antenna beam to the received signal property of the respective wireless signal transmitted on the third antenna beam is substantially equal to a third predetermined value.

In some embodiments, the third antenna beam is substantially half-way between the first antenna beam and the second antenna beam, and the second predetermined value is substantially equal to the third predetermined value.

In some embodiments, the method further comprises: estimating a distance between the wireless station and the reference point of the multi-beam antenna pattern; and estimating a location of the wireless station based on the estimated bearing angle from the reference point of the multi-beam antenna pattern and the estimated distance between the reference point of the multi-beam antenna pattern and the wireless station.

In some embodiments, estimating the distance between the wireless station and the reference point of the multi-beam antenna pattern is based on at least one of: received signal strength; and timing synchronization at the wireless station.

In some embodiments, the method further comprises: for each of at least one additional multi-beam antenna pattern: for each of a plurality of beaming angles of the additional multi-beam antenna pattern, receiving a plurality of wireless signals on respective antenna beams of the additional multi-beam antenna pattern; and estimating a bearing angle from a reference point of the additional multi-beam antenna pattern to the wireless station based on a received signal property, at the wireless station, of each of the plurality of wireless signals transmitted on the respective beams of the additional multi-beam antenna pattern for each of the plurality of beaming angles of the additional multi-beam antenna pattern.

In some embodiments, the method further comprises: reporting the estimate of the location of the wireless station to at least one access point.

In some embodiments, the method further comprises: estimating a radial distance from the wireless station to at least one of the respective reference points of the plurality of multi-beam antenna patterns based on at least one of: received signal strength; and timing synchronization at the wireless station.

In some embodiments, estimating the location of the wireless station is determined based on the location of intersection of the estimated bearing angles of the wireless station from the plurality of multi-beam antenna patterns and hyperbolas representing the estimated radial distances between the wireless station and the respective reference points of at least a subset of the plurality of multi-beam antenna patterns.

In some embodiments: the plurality of multi-beam antenna patterns are not all located at the same elevation; and estimating a location of the wireless station comprises estimating an elevation of the wireless station based on the estimated bearing angles and the estimated radial distances of the wireless station relative to the reference points of the plurality of multi-beam antenna patterns and the elevations of the plurality of multi-beam antenna patterns.

Some embodiments of this application provide for the estimation of the location of wireless stations (transceivers) in a multipath propagation environment.

Some embodiments of this application make use of and/or re-use existing transmitted signal formats and wireless transceiver apparatus.

Some embodiments of this application reduce cost of implementing a location estimation system, relative to the cost of implementing conventional location estimation techniques such as receiving GPS signals, by reusing existing antennas and apparatus in the wireless terminals.

Some embodiments of this application use the estimated location information to assign access resources to wireless stations based on system conditions and identity of the terminal.

Other aspects and features of embodiments of the present application will become apparent, to those ordinarily skilled in the art, upon review of the following description of specific embodiments of the application.

BRIEF DESCRIPTION OF THE DRAWINGS

Embodiments of the present application will now be described, by way of example only, with reference to the accompanying drawing figures, wherein.

DETAILED DESCRIPTION

Figure 1:
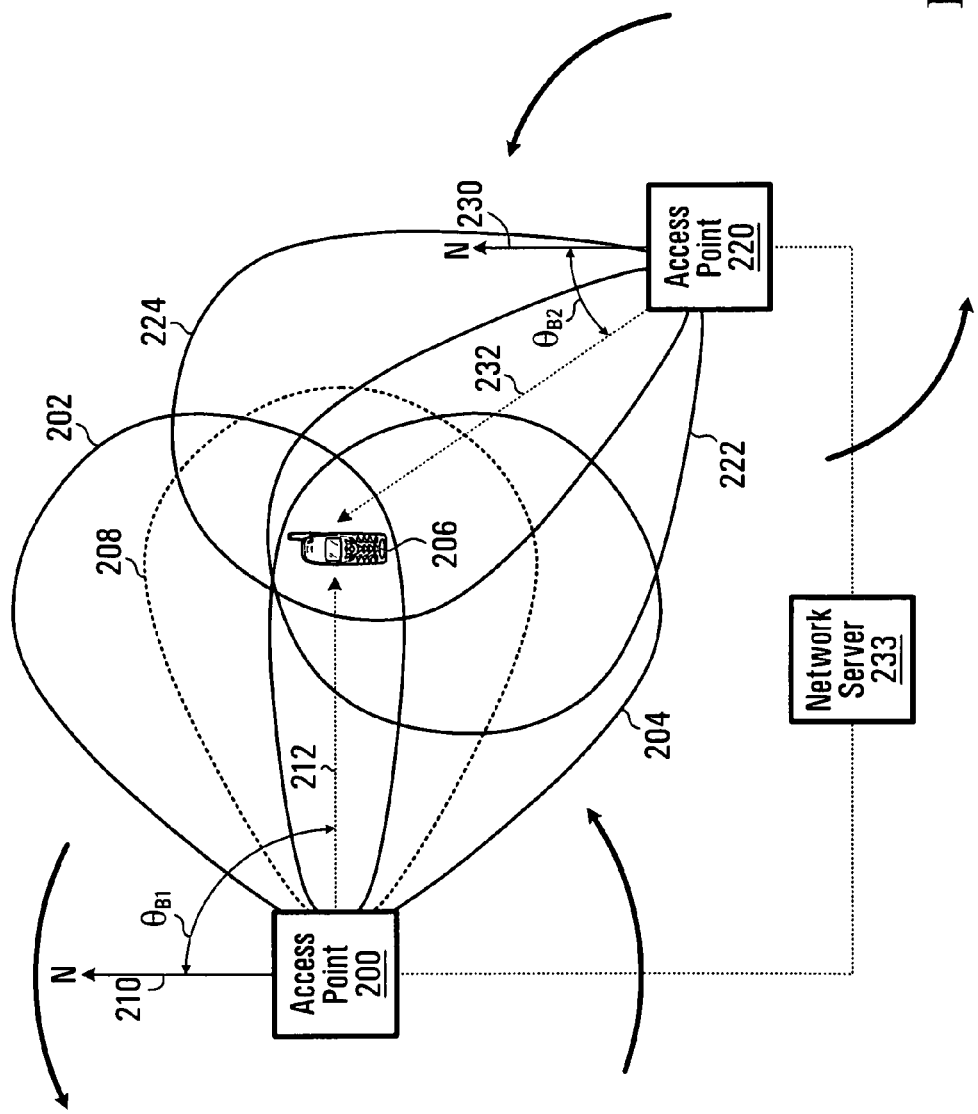
FIG. 1 is a plan view of a wireless communication system that might be used to implement some embodiments of the present application.

Embodiments of this application provide a method and apparatus for determining the location of wireless stations equipped with radio transceivers in non-multipath and multipath radio propagation environments. The system makes use of a multi-beam antenna pattern at an access point, such as a base station, such that the bearing angle of a wireless stations relative to the access point can be determined by a ratio of distinct signal components transmitted on respective antenna beams of the multi-beam antenna. It should be understood that the term "wireless stations" is used herein to refer to any piece of equipment that includes a wireless transceiver. Non-limiting examples of wireless stations include base stations, relay stations, mobile stations, etc.

Some embodiments of this application makes use of existing radio signals that are already being used to communicate with wireless terminals. Some embodiments of the present invention make use of a multi-beam antenna pattern from at least one access point with transmission of part of the normal communications signal through each of the multiple beams. These altered transmissions are transparent to the wireless terminal for its normal operation. However, by reporting a received signal property of the signals transmitted on the respective beams of the multi-beam antenna pattern, at a plurality of beaming angles as the multi-beam antenna pattern is steered through the plurality of beaming angles, it is possible to establish a bearing angle between the access point and the wireless terminal. By also making use of received signal strength information and/or timing synchronization information, such as the range timing offset correction inherent in many mobile communications protocols, it is also possible to establish a radial distance estimate between the access point and the wireless terminal. With both the bearing angle and the radial distance, the location of the wireless station can be established in relation to the location of the access point. In some embodiments, the location of the wireless station is estimated at the intersection of the bearing angles to multiple access points.

In some embodiments, the determined estimate of the location of wireless stations is used to control access to the network by terminals based on their estimated location. In an enterprise, for example, some public areas may permit access by any terminal whereas other restricted areas may permit network access only from specially authorized terminals. In another example, the location of the terminal may be used to assign network resources such as to balance traffic loading. This may include, for example, permitting guest access for visitors in some areas of the coverage region.

Some embodiments of the present application are based on signals and transmission formats of existing mobile communications techniques and services, including, for example, the systems of IEEE802.11, IEEE 802.16, ETSI/3GPP LTE and GSM.

Some embodiments of the present application might provide improved location estimation accuracy in a multipath environment, such as is often the case in indoor environments.

In some embodiments, no special apparatus is required at a wireless station in order to estimate the location of the wireless station.

FIG. 1 is a plan view of a block diagram of a wireless communication system in accordance with an embodiment of the present invention.

The wireless communication system illustrated in FIG. 1 includes a first access point 200, a second access point 220, a network server 233 and a wireless terminal 206.

To estimate the location of the wireless terminal 206, the antennas of the access points 200 and 220 are configured to incorporate multi-beam antenna patterns. The first access point 200 has a first antenna beam 202 and a second antenna beam 204. The second access point 220 also has a first antenna beam 222 and a second antenna beam 224. In the illustrated embodiment, the first access point 200 also has a third antenna beam 208 that is intermediate its first antenna beam 202 and second antenna beam 204. The functionality of this third antenna beam 208 will be discussed later.

The first antenna beam 202 and the second antenna beam 204 of the first access point 200 overlap in a coverage area of the first access point 200, but are pointed at different angles such that a wireless station, such as the wireless terminal 206, will see a different signal amplitude from antenna beams 202 and 204. The same is also true of the antenna beams 222 and 224 of the second access point 220. Such multi-beam antenna patterns may be produced, for example, by two dipole antennas with a common centre and an angle offset between them the antennas.

In some embodiments, the antenna beams 202 and 204 of the first access point may be arranged to rotate together in time through 360 degrees of beaming angles using either mechanical scanning apparatus (i.e. rotating the antenna elements) or through electronic beam steering (e.g. by using variable phase shifters in the antenna element feeds, referred to herein as "electronic steering"). The antenna beams 222 and 224 of the second access point 220 may be configured likewise. The antenna beams 202 and 204 of the first access point 200 and the antenna beams 222 and 224 of the second access point 220 may rotate continuously in time (i.e. sweep around like a lighthouse) or in steps (e.g. in 1 degree steps) or may be directed to different locations in a discontinuous manner (e.g. with electronic steering) to a subset of all possible beaming angles.

In operation, with reference to the first access point 200, the first access point 200 transmits a wireless signal on the first antenna beam 202 and a wireless signal on the second antenna beam 204 for each of a plurality of beaming angles of the first access point 200 as the antenna beams are rotated to each of the beaming angles. For each beaming angle, the wireless signal transmitted on the first antenna beam 202 has a component that is distinct from a component of the wireless signal that is transmitted on the second antenna beam 204, such that the wireless terminal can resolve a received signal property, such as received signal strength, for the distinct components of the wireless signals transmitted on the respective antenna beams 202 and 204. The wireless terminal's location relative to the first antenna beam 202 and the second antenna beam 204 affects the received signal properties of the wireless signals transmitted on first and second antenna beams measured at the wireless terminal. When the wireless terminal 206 is substantially halfway between the first and second antenna beams 202 and 204, as is the case in the instant depicted in FIG. 1, the wireless terminal may measure substantially equal received signal properties, such as received signal strength, for wireless signals transmitted on the first and second antenna beams, respectively.

In some embodiments, the beaming angles of an access point are measured from a reference angle of the access point. In FIG. 1, the reference angle of the first access point 200 is indicated at 210 and the reference angle of the second access point 220 is indicated at 230. While the reference angles 210 and 230 of the first and second access points are in the same direction in the embodiment shown in FIG. 1 (indicated as corresponding to magnetic North "N" in the specific embodiment illustrated), in some embodiments the reference angle of each access point may be arbitrarily chosen and different from the reference angle of any other access point, provided that the difference in reference angle is taken into account.

It may be advantageous for all of the access points in a system to use the same reference angle (e.g. "North"). This enables bearing angles obtained from measurements from the signals from multiple access points to be more easily compared. By measuring the bearing angles to multiple base stations, the location of the wireless terminal may be established at the intersection of the multiple bearing angles.

If the beaming angle of the multi-beam antenna pattern established by the first and second antenna beams 202 and 204 is measured from the reference angle 210 of the first access point 200 and if the beaming angle of the multi-beam antenna pattern formed from the first antenna beam 202 and the second antenna beam 204 is assumed to correspond to a bearing line that substantially bisects the angle between the first antenna beam and the second antenna beam (which is substantially 90° in the embodiment illustrated in FIG. 1, but more generally may be any angle that provides at least some overlap of the antenna beams of the multi-beam pattern), then the estimated bearing angle from a reference point of the first access point 200 (which is generally assumed to be co-located with the access point) to the wireless terminal 206 corresponds to the beaming angle at which a received signal property, such as received signal strength, of the wireless signal transmitted on the first antenna beam and of the wireless signal transmitted on the second antenna beam are substantially equal. As such, a bearing angle of the wireless terminal 206 from a multi-beam antenna pattern access point, such as the access points 200 and 220 shown in FIG. 1, can be determined based on a beaming angle of the multi-beam antenna pattern and a received signal property of the wireless signals transmitted on respective beams of the multi-beam antenna pattern.

In FIG. 1, the estimated bearing angle of the wireless terminal 206 from the first access point 200 relative to the reference angle 210 of the first access point 200 is indicated at $\theta_{B1}$ along a bearing line 212 from the reference point of the first access point 200. Similarly, the estimated bearing angle of the wireless terminal 206 from the second access point 220 relative to the reference angle 230 of the second access point is indicated at $\theta_{B2}$ along a bearing line 232 from the reference point of the second access point.

The bearing angle between a single access point 200 or 220 and the wireless terminal 206 establishes one coordinate of the location of the wireless terminal. The wireless terminal is located somewhere along the bearing line from the access point. To determine a second coordinate (or additional coordinates for three dimensions) in order to estimate a location of the wireless terminal 206, a radial distance from the access point 200 or 220 to the wireless terminal 206, or a location of intersection of multiple bearing angles from multiple access points, may be used in some embodiments of the present application. For example, with reference to FIG. 1, a location of the wireless terminal 206 may be estimated based on a location of intersection of the bearing lines 212 and 232 corresponding to the bearing angles $\theta_{B1}$ and $\theta_{B2}$.

In some embodiments, a multi-beam antenna having both horizontal components and vertical components is used to estimate a location of a wireless station in three dimensions. For example, in some embodiments a multi-beam antenna having two horizontal beam components and two vertical beam components is used and the received signal levels of the wireless signals generated by the two horizontal beam components are used to first estimate a bearing angle of a wireless station in a horizontal plane and then the received signal levels of the wireless signals generated by the two vertical beam components are used to estimate a bearing angle of the wireless station in a vertical plane that is aligned with a bearing line defined by the bearing angle in the horizontal plane.

As the multi-beam pattern rotates in the horizontal plane, the wireless station that is being located notes the bearing angle at which it is aligned with the horizontal beam angle, which might, for example, be when the two signal components from the two horizontal beam components are substantially equal. The wireless station also at the same horizontal beaming angle measures the two vertical signal components from the two vertical beam components of the beam pattern. Determination of the vertical bearing angle is then determined in accordance with the determination of the horizontal bearing angle described herein. The location of the wireless terminal is then estimated to be a point of intersection of these two three dimensional bearing angles is the location of the terminal.

Following are a few exemplary techniques that might be used to improve the accuracy of the estimated distance from a single access point to a wireless station, to be used in conjunction with a bearing angle from the access point to determine an estimate of the location of the wireless station.

Distance Determination

If the distance measurement is to be made, the distance can be determined in several ways. Four examples are:

Received Signal Strength Indicator (RSSI)

This technique utilizes a measured received signal power level at a wireless station and/or at an access point to estimate distance between the access point and the wireless station. However, this technique can suffer from fades and reflections. It can be made satisfactory through the use of calibration of the environment by, for example, walking through the coverage area and recording the location and signal strength to be used for calibration for later operations. Additionally, dynamic algorithms could be used to enhance the distance estimation—for example, it is typically unlikely that a person in a building can move 50 meters in one second. The RSSI technique may also be enhanced through the use of additional sensors in the environment at known locations that report signal strengths to maintain calibration for operational measurements.

Timing Advance

Many mobile communications systems synchronize the transmissions from the wireless terminal transceivers so that they are compensated for the time-of-flight of the radio signals (such that the signals from multiple terminals all arrive at an access point, such as a base station, at a coordinated time). The wireless terminals are thus equipped to adjust their transmission timing accurately in response to measurements of signal time-of-arrival at the base station. This process is sometimes referred to as time-ranging or "timing-advance". When the terminal's transmission signals are adjusted to arrive synchronized at the base station, the calculated timing-advance instruction sent to adjust the wireless terminal's transmission is equivalent to the round-trip time of the signal travel time between the base station and the wireless terminal. Half of this time, multiplied by the speed of light (i.e. "c" in the medium of transmission) is the radial distance between the terminal and the base station. Use of the timing advance measure thus provides a second coordinate in the form of a radius from the base station in order to estimate a location of the wireless terminal.

In some cases, depending on the desired accuracy of the estimated location information, the resolution of the timing advance control signals may not be adequate. However, in some cases, the resolution might be improved with additional processing. For example, the access point could have an apparatus that uses knowledge of the timing advance increment/decrement instructions to work out a more accurate time. Often the timing control loop will advance and retard the timing to compensate a device whose signal may be in-between the signalling steps. The ratio of the time spent advanced to retarded, for example, then may be used to provide an estimate of the signal's timing to a resolution below the step-size of the timing advance signals. This is a form of "super-resolution".

In some embodiments, additional hardware or software processing are added to the transceiver of a wireless terminal. For example the aspects of the receiver used to establish symbol timing could report their calculations used to adjust the received signal timing, and this is representative of the timing advance to a greater resolution than may be used by the basic timing advance control loop. Here the hardware could be designed to determine an accurate time between the access point and the terminal. From this, an accurate distance could be estimated. This would be a similar idea to introducing a GPS chip into a cellular phone.

Time Using Existing Hardware in Device

This technique may need only relatively minor changes to firmware, hardware, or a combination of the two on the wireless terminal. In this technique, hardware in the terminal receiver synchronizes to the access point clock. In some receivers, additional hardware is used to synchronize circuitry to sub-clock accuracy.

In some embodiments, if the wireless terminal 206 is able to receive signals from multiple access points, e.g. both the first access point 200 and the second access point 220, the bearing angle and radial distance to each access point may determined and the wireless terminal's location estimated as the intersection of the set of bearing angles and radial distances.

In some embodiments, the difference in timing advance of the wireless terminal's signals required to synchronize with multiple access points establishes a hyperbola between each of the access points with the location of the terminal at the intersection of the bearing angles to the base stations and the hyperbola. Use of this technique can potentially improve the accuracy of the location estimate. In many cases access points, such as base stations, are synchronized in their timing as part of the standard configuration of the mobile communications system to assure minimum interference among their transmissions. In some embodiments, if the access points are not synchronized in their timing, then additional measures of their timing offsets can be made and used to compensate the timing advance measures from different stations.

The rotation of the beams in this system need not be continuous or always in the same direction. In some embodiments, the signals transmitted at each angle include an "angle-code" indicating the angle of the beam, and so it is not necessary for the angles to be in a continuous increasing, or decreasing or fixed pattern. The beam angle may move to arbitrary angles in arbitrary order (such as by using electronic beam steering). The beam pattern signals may also be interspersed among non-beamed signs. For example, the operation of the base station may be chosen to send the beamed signal at the start of each system frame interval.

In some embodiments, codes representative of the beaming angles might not be transmitted by the access points. For example, the wireless terminals may simply report measurements of the received signal properties for each beaming angle and the access point or network server, which would be aware of the beaming angle to which the measurements provided by the wireless terminals correspond, may estimate the bearing angle.

The calculations to determine the bearing angle and/or location of the wireless terminal may be performed at one or more of the access points, at the network server 233 attached to a network communicating with the base station, at the wireless terminal itself or as a result of calculations/measurements at a combination of those elements.

In some embodiments, for a simple and low cost system, wireless stations, such as the wireless terminal 206 shown in FIG. 1, may report to an access point (using a signalling or message channel of the mobile communications system), such as the first access point 200, the beaming angle code and the ratio of received signal powers of the respective wireless signals transmitted on the first and second antenna beams of the first access point measured at the wireless terminal when the ratio was nearest one, i.e. for the beaming angle at which the wireless terminal received substantially equal signal powers from the first and second antenna beams of the first access point. In the exemplary embodiment illustrated in FIG. 1, this would inform the access point 200 of the bearing angle $\theta_{B1}$ for the mobile. By using this bearing angle in conjunction with an estimate of a radial distance from the access point to the wireless terminal based on, for example, RSSI and/or timing synchronization information, the access point can then estimate the location of the wireless terminal.

With this arrangement, no additional apparatus is required at the wireless terminals. If the wireless terminal is able to receive signals from multiple access points it may communicate with each access point, and collectively the access points may determine the intersection of their individual location estimates to provide improved accuracy to the location estimate. This approach has the advantage that the base stations may incorporate mapping information about the local area into their calculations and put the location information in the context of the local geography (e.g. floor plan of building or neighbourhood map).

In another alternative, terminals with more advanced computing capabilities may make the signal measurements and calculate their location themselves. In this alternative the terminal may still rely on the standard access point procedure for measuring the timing-advance as this is a part of the communications protocol and the base station automatically informs the terminal of the result in order for the terminal to correctly set its timing-advance. The procedures at the wireless terminal may make use of multiple measures of reference angles and timing advances to multiple base stations in order to develop a better location estimate.

In some embodiments, in order to present the location estimate in a "user friendly" manner, the terminal could contain a database of access point locations and local geography (e.g. floor plan) or it could obtain this information and access point locations from a data base stored elsewhere in the network.

To assist the terminals in their calculations, the access points may broadcast their location coordinates and reference angle. In some embodiments, the wireless terminals may request this needed information (reference angle and access point location) from the access points by, for example, querying a system database or third party application using the data communications facilities inherent in the radio communications system.

Depending on the design of the antenna system to form the multiple beams, there may be some ambiguity in the beam angles and resolution. The arrangement of antenna elements and their proximity to nearby objects (reflectors) in the vicinity of the base station may distort the beams or produce side-lobes (or back-lobes). The resolution of the beam shape may also be distorted if there are excessive scattering objects. These effects may cause the wireless terminal to receive several signals from the multi-beam access point with equal amplitudes from several beaming angles as the beams rotate.

In such cases, some ambiguities may be resolved by utilizing the beaming angle code for which the greatest number of subcarriers are close to one, and also have the greatest signal amplitude. To further improve the location estimates in these cases it may be desirable to introduce additional beams. The terminal may thus measure received signal properties across several beams to resolve multiple ambiguities.

These additional measures may also provide improved resolution of angles if the beam patterns are not well defined in practice. For example, a third antenna beam 208 is shown in phantom in FIG. 1. A measure of received signal properties between the first and second antenna beams 202 and 204 and this additional beam 208 may be used to determine which beam pair is being measured and to further improve accuracy in the signal ratio between beams. The third antenna beam 208 in FIG. 1, for example, may be used also to provide additional angle resolution as, in addition to the equality of received signal properties for wireless signals transmitted on the beams 202 and 204, there should be common ratio of received signal properties between beams 202 and 208 and between beams 204 and 208 when the beaming angle of the multi-beam pattern is aligned with the bearing angle of the wireless terminal 206 from the first access point 200, as the third antenna beam 208 is located mid-angle of the first and second antenna beams.

To further improve the performance of the system for communications, the access points may save the beam angle reported by the wireless terminal and (re-)use that angle for transmissions (and receptions) that are intended for communication with the terminal. In this way the base station has the opportunity to improve the signal strength (i.e. "link budget") for the service to the terminal.

For illustrative purposes, only a single wireless terminal and two access points are shown in FIG. 1. More generally, embodiments of the present invention may be implemented for tracking any number of wireless terminals using any number of access points capable of generating multi-beam antenna patterns.

In some embodiments, the estimation of the bearing angle and/or location of wireless terminal is determined in the network server 233.

In some embodiments, the network server 233 may include an information store for storing location information and identity information pertaining to wireless terminals.

In some embodiments, the network server 233 passes bearing angle information between access points, so that one or more of the access points can estimate the location of wireless terminals based on a location of intersection of two or more bearing angles for each wireless terminal.

Embodiments of the present application may be implemented in wireless communication systems operating with many different signalling formats, such as signalling formats based on OFDM, CDMA, TDMA and UWB, to name a few.

Figure 2:
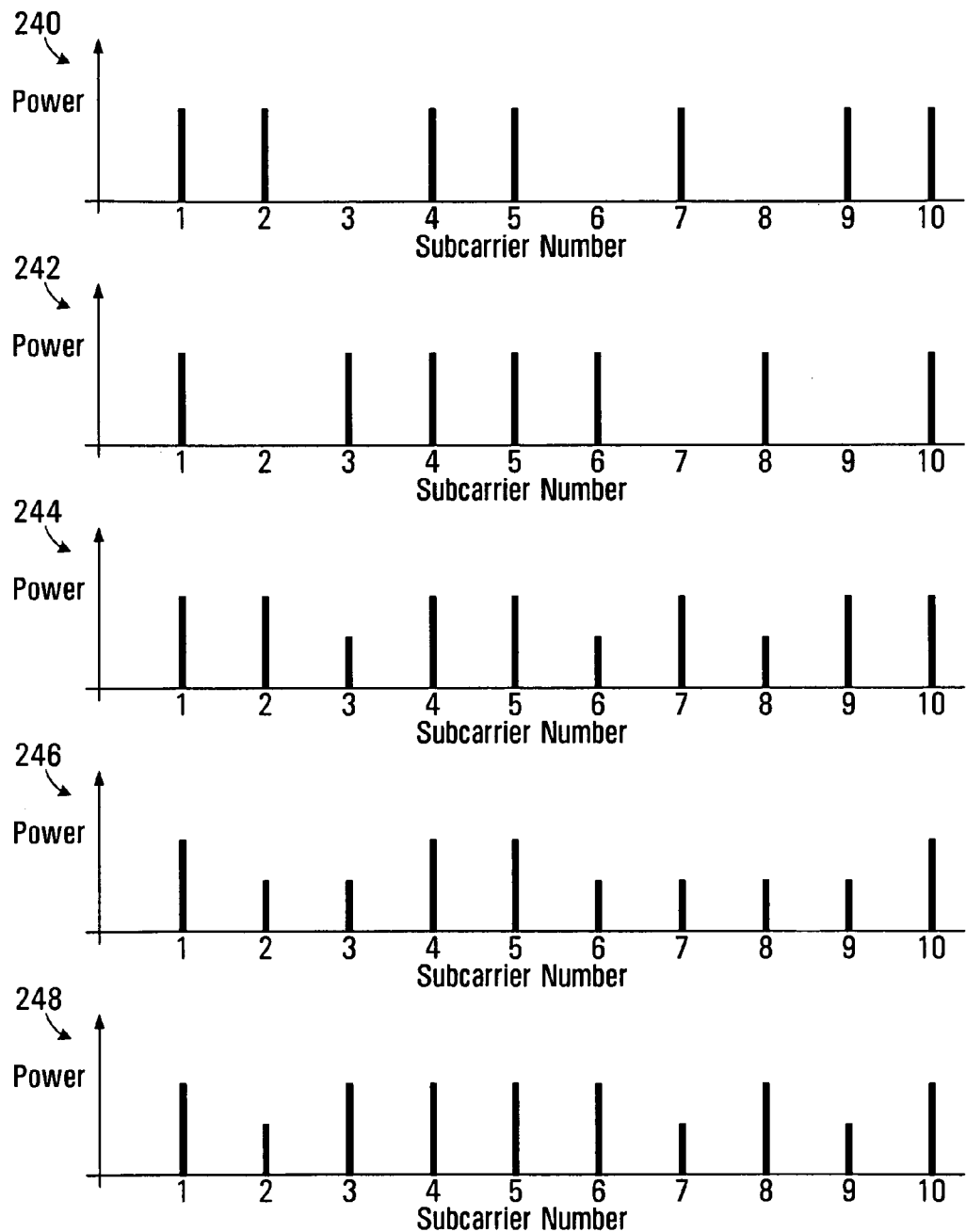
FIG. 2 is a plot of transmitted and received signal power levels that might be realized in some OFDM-based embodiments of the present application.

FIG. 2 is a plot of transmitted and received signal powers that might be observed in one very specific OFDM-based embodiment of the present application. FIG. 2 is provided for illustrative purposes only and should not be considered as limiting as to the scope of the present application. In FIG. 2 it is assumed that a subset of subcarriers of an OFDM signal are transmitted on a first antenna and another subset of subcarriers of the OFDM signal are transmitted on a second antenna, such that the subcarriers corresponding to subcarrier number 1, 2, 4, 5, 7, 9 and 10 are transmitted on the first antenna and the subcarriers corresponding to subcarrier number 1, 3, 4, 5, 6, 8 and 10. The transmitted power levels of the subcarriers transmitted on the first and second antennas are indicated at 240 and 242 respectively in FIG. 2.

In the example illustrated in FIG. 2, subcarriers 1, 4, 5 and 10 are common to the two beams, while subcarriers 2, 3, 6, 7, 8 and 9 are distinct (subcarriers 2, 7 and 9 only on the first antenna and subcarriers 3, 6 and 8 only on the second antenna). This illustration is in the context of subcarriers as may be used in an Orthogonal Frequency Division Multiplexing (OFDM) radio system, but the concept is equivalently applicable to the timeslots used in a Time Division Multiple Access (TDMA), code transmission in a Code Division Multiple Access, and the pulses used in pulse-based ultra wideband UWB.

In an OFDM transmission system the subcarriers that are different between the antenna beams may be a subset of the pilot subcarriers. In an OFDM transmission system the subcarriers that are different between the antenna beams may be a subset of the pilot subcarriers. In a TDMA system, different antenna beams could be used for nearby timeslots or symbols. In a CDMA system, different antenna beams could be used for nearby transmissions of the spreading code at equal power.

Plots indicated at 244, 246 and 248 in FIG. 2 correspond to received signal power levels that might be observed at a wireless terminal receiving the OFDM signals transmitted on the first and second antenna beams in three locations relative to the first and second antenna beams.

At a wireless terminal, the receiver detects the signals transmitted from both antennas (from both antenna 202 and 204 for the access point 200 in the example of FIG. 1). As part of its detection process, the receiver in the wireless terminal determines the strength of each subcarrier. The ratio of the strength of the distinct subcarriers sent from one beam to the distinct subcarriers on the other beam provides a measure of the location of the wireless terminal in relation to the beaming angle of the beams from the access point. For example, if the subcarriers from the two beams are measured to be of equal or nearly equivalent strength, then the wireless terminal is located on a line midway between the two beams. For a range of angles at or near the angle midway between the beams, the offset angle may be closely approximated by a linear relation to the received signal strength ratio.

The plot of received signal power levels indicated at 244 corresponds to received signal power levels that might be observed at the wireless terminal when it is closer to the first antenna beam than it is to the second antenna beam. Since received signal power generally drops off with angle, when the wireless terminal is located closer to the angle of the first antenna beam than it is to the second antenna beam, the subcarriers that are only transmitted on the second antenna beam (subcarriers 3, 6 and 8) are received at a reduced power level relative to the subcarriers that are only transmitted on the first antenna beam (subcarriers 2, 7 and 9).

The plot of received signal power levels indicated at 246 corresponds to received signal power levels that might be observed at the wireless terminal when it is equidistant between the first antenna beam and the second antenna beam. When the wireless terminal is located equidistant to the first antenna beam and the second antenna beam, the subcarriers that are only transmitted on the second antenna beam (subcarriers 3, 6 and 8) are received at substantially the same power level as the subcarriers that are only transmitted on the first antenna beam (subcarriers 2, 7 and 9).

The plot of received signal power levels indicated at 248 corresponds to received signal power levels that might be observed at the wireless terminal when it is closer to the second antenna beam angle than it is to the first antenna beam angle. When the wireless terminal is located closer to the second antenna beam angle than it is to the first antenna beam angle, the subcarriers that are only transmitted on the first antenna beam (subcarriers 2, 7 and 9) are received at a reduced power level relative to the subcarriers that are only transmitted on the second antenna beam (subcarriers 3, 6 and 8).

If the wireless terminal makes a series of measurements of subcarrier ratios over time as the beams from the access point rotate through a plurality of beaming angles, the measurements will show equality (or almost equality) when the beaming angle is directed towards (or almost towards) the wireless terminal. As illustrated in FIG. 2, when the wireless terminal is equidistant between the beams, the ratio of the received signal strength of the subcarriers sent on the two beams is nearly equal. If the wireless terminal is located closer to the first beam than to the second antenna beam, then the subcarrier signals from the first antenna beam are larger than those of the second antenna beam and the ratios of the received signal powers of the distinct subcarriers of the first antenna beam to those of the second antenna beam are greater than 1 (i.e.: subcarrier 2/subcarrier 3>1, subcarrier 7/subcarrier 6>1, subcarrier 9/subcarrier 8>1). If the wireless terminal is located closer to the second antenna beam than to the first antenna beam, then the subcarrier signals from the second antenna beam are larger than those of the first antenna beam and the ratios of the received signal powers of the distinct subcarriers of the first antenna beam to those of the second antenna beam are less than 1 (i.e. subcarrier 2/subcarrier 3<1, subcarrier 7/subcarrier 6<1, subcarrier 9/subcarrier 8<1). Thus the location of the terminal in relation to the angle of two beams can be estimated from the ratio of the subcarrier signal powers. As the subcarriers are sent in the same symbol and experience the same fading and multipath, this ratio measure is not sensitive to propagation effects (even though the individual signals may be affected). This procedure may also be used to compare TDMA timeslot or CDMA code transmissions from the separate antennas (for TDMA and CDMA systems).

By measuring the ratio of two (or more) subcarrier strengths sent as part of the same transmission from the base station, and awaiting the (approximately) equal strength condition, the effects of multipath propagation in the environment are mitigated as the same propagation conditions equally affect signals from both of the beams. In this way the dual beam (or multiple beam approach) has the advantage in the cluttered multipath environment, that the receiver can compare the signal strength of two nearby subcarriers (or timeslots), and hence is not confused by the significant variation in signal strength seen in the multipath environment. Therefore, embodiments of the present application provide improved accuracy over conventional systems that monitor for the maximum of a single beam.

As noted above, embodiments of the present application are not limited to OFDM-based implementations, such as the one discussed above with reference to FIG. 2. For example, embodiments of the present invention may be implemented in wireless communication systems that use time division multiple access (TDMA), Code Division Multiple Access (CDMA) and/or ultra wideband (UWB) signalling techniques, to name a few.

A brief description of how embodiments of the present application might be realized in CDMA, TDMA and UWB communication systems is provided below for illustrative purposes.

CDMA Example

One example of using an embodiment of the present application in a CDMA system is to make use of the preamble at the beginning of each transmission burst to provide the different signals for each antenna beam. These preambles are provided at the beginning of each burst to enable channel estimation and training of the receiver. In a CDMA application in accordance with such an embodiment, a portion of the preamble (e.g. ½) is sent over one antenna pattern and the other portion through the other (i.e. Half through one antenna, and half to the other), assuming for illustrative purposes that the multi-beam antenna includes two antennas. The receiver would then determine its relation to the beam angle of the antenna patterns by the ratio of the signal strength of the two parts of the preamble.

In an alternative CDMA implementation in accordance with another embodiment of the present application, a different CDMA spreading code could be used for a portion of the transmitted signal which is sent simultaneously through each of the antenna patterns. The receiver would measure the ratio of the signals with the two codes to determine its relation to the beam angle. When the two are received at the same strength, for example, the receiver would be midway between the two beams. In many CDMA systems it would not be necessary to use two codes for the two antenna patterns. One antenna could simply transmit a delayed version of the signal from the other The two signals (one delayed by a predetermined amount) would be received and resolved into their components by, for example, the rake receiver. The ratio of the signal strength of the two components would then be used as an estimate of the receiver's angle with the beams. For example if the two components with the predetermined time-offset were of the same strength, then the receiver would be located mid-way between the transmitter beams.

TDMA Example

Here a timeslot can be used to send the antenna codes. A full timeslot could be allocated to each antenna, although this may be wasteful. One possible method is to use the frame preamble, and to apply half to one antenna, and half to the other. At the terminal, the preamble should have equal power if the terminal is midway between the antenna beams. If it is closer to the antenna used for the first half of the preamble, then the received signal should be higher in the first half of the preamble. (This is similar to using the burst preamble in the CDMA technique mentioned above).

UWB Example

Pulse-Based UWB Systems

Pulse-based UWB systems are characterized by very (very) short transmission pulses. Some "UWB" systems are actually OFDM waveforms and hence covered by the OFDM embodiment described above. In some embodiments of this application in a pulse-based UWB system, alternate pulses are transmitted through the alternate antenna beams. The receiver would measure its relation to the beam angles through the ratio of the signal strength of successive pulses. For example, pulses of equal amplitude could indicate the terminal was midway between the beams. With alternating pulses there would be an ambiguity at the receiver of which pulse came from which antenna beam, however this ambiguity could be resolved through signalling channel communication used to designate pulses coming from one of the antenna beams. The receiver would thus be able to determine which pulse to use as the denominator in making the ratio calculation. As the signal strengths may vary due to multipath propagation conditions, the receiver would be configured to measure the earliest received pulse (of the multipath signal) and to average the signal strength across a number of pulses.

Figure 3:
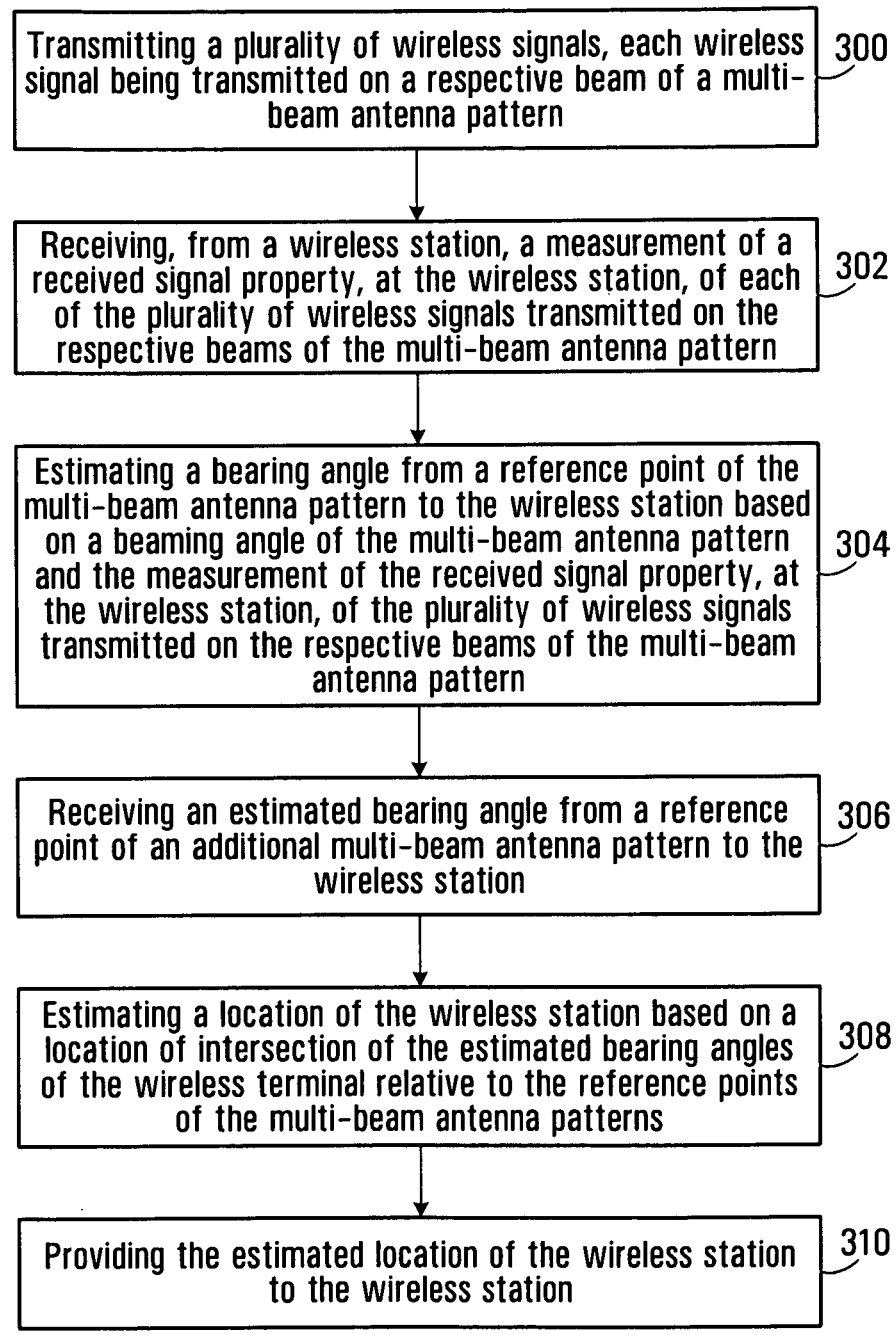
FIG. 3 is a flowchart of a method in an access point for estimating a location of a wireless terminal in accordance with an embodiment of the present application.

FIG. 3 is a very specific example of a method that might be implemented in a multi-beam access point in accordance with some embodiments of the present application. The flowchart of FIG. 3 is provided for illustrative purposes only and should not be construed as limiting as to the scope of the present application. The flowchart shown in FIG. 3 includes six steps 300, 302, 304, 306, 308 and 310.

In step 300, a plurality of wireless signals are transmitted, each wireless signal being transmitted on a respective beam of a multi-beam antenna pattern.

In step 302, a measurement of a received signal property, at the wireless terminal, of each of the plurality of wireless signals transmitted on the respective beams of the multi-beam antenna pattern is received.

In step 304, an estimate is made of a bearing angle from a reference point of the multi-beam antenna pattern to the wireless terminal based on a beaming angle of the multi-beam antenna pattern and the measurement of the received signal property, at the wireless terminal, of the plurality of wireless signals transmitted on the respective beams of the multi-beam antenna pattern.

In step 306, an estimated bearing angle from a reference point of an additional multi-beam antenna pattern to the wireless terminal is received. This estimate may be provided by an access point that generates the additional multi-beam antenna pattern in order to determine the additional estimated bearing angle in accordance with steps 300, 302 and 304 above.

In step 308, a location of the wireless terminal is estimated based on a location of intersection of the estimated bearing angles of the wireless terminal relative to the reference points of the multi-beam antenna patterns.

In step 310, the estimated location of the wireless terminal is provided to the wireless terminal and/or to other users or network services.

Figure 4:
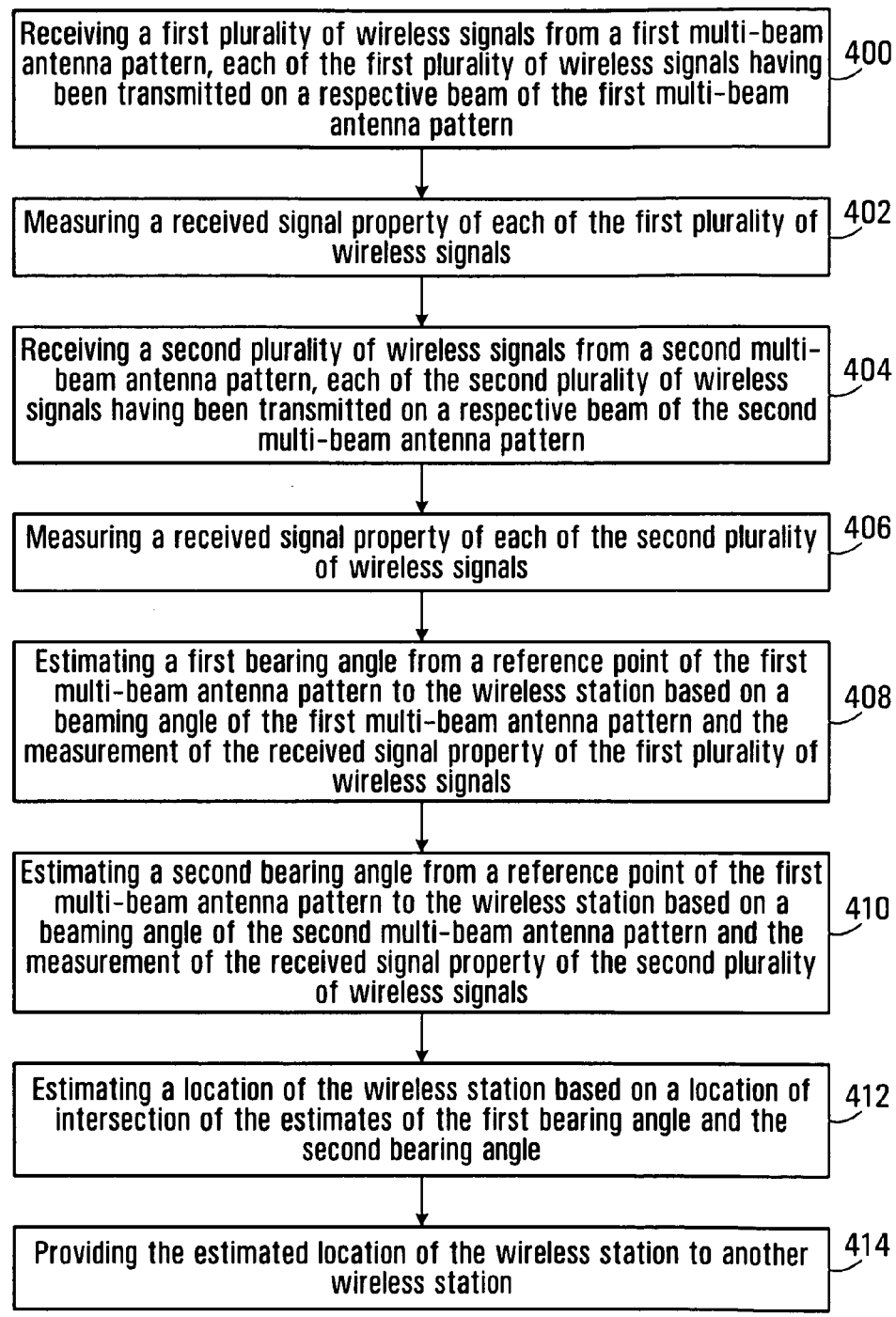
FIG. 4 is a flowchart of a method in a wireless terminal for estimating a location of the wireless terminal in accordance with an embodiment of the present invention.

FIG. 4 is a very specific example of a method that might be implemented in a wireless terminal in accordance with some embodiments of the present application. The flowchart of FIG. 4 is provided for illustrative purposes only and should not be construed as limiting as to the scope of the present application. The flowchart shown in FIG. 4 includes eight steps 400, 402, 404, 406, 408, 410, 412 and 414.

In step 400, the wireless terminal receives a first plurality of wireless signals from a first multi-beam antenna pattern, each of the first plurality of wireless signals having been transmitted on a respective beam of the first multi-beam antenna pattern.

In step 402, the wireless terminal measures a received signal property of each of the first plurality of wireless signals.

In step 404, the wireless terminal receives a second plurality of wireless signals from a second multi-beam antenna pattern, each of the second plurality of wireless signals having been transmitted on a respective beam of the second multi-beam antenna pattern.

In step 406, the wireless terminal measures a received signal property of each of the second plurality of wireless signals.

In step 408, the wireless terminal estimates a first bearing angle from a reference point of the first multi-beam antenna pattern to the wireless terminal based on a beaming angle of the first multi-beam antenna pattern and the measurement of the received signal property of the first plurality of wireless signals.

In step 410, the wireless terminal estimates a second bearing angle from a reference point of the second multi-beam antenna pattern to the wireless terminal based on a beaming angle of the second multi-beam antenna pattern and the measurement of the received signal property of the second plurality of wireless signals.

In step 412, the wireless terminal estimates a location of the wireless terminal based on a location of intersection of the estimates of the first bearing angle and the second bearing angle.

In step 414, the wireless terminal provides the estimated location of the wireless terminal to an access point and/or to other users or network services (including, for example, applications in the terminal).

Figure 5:
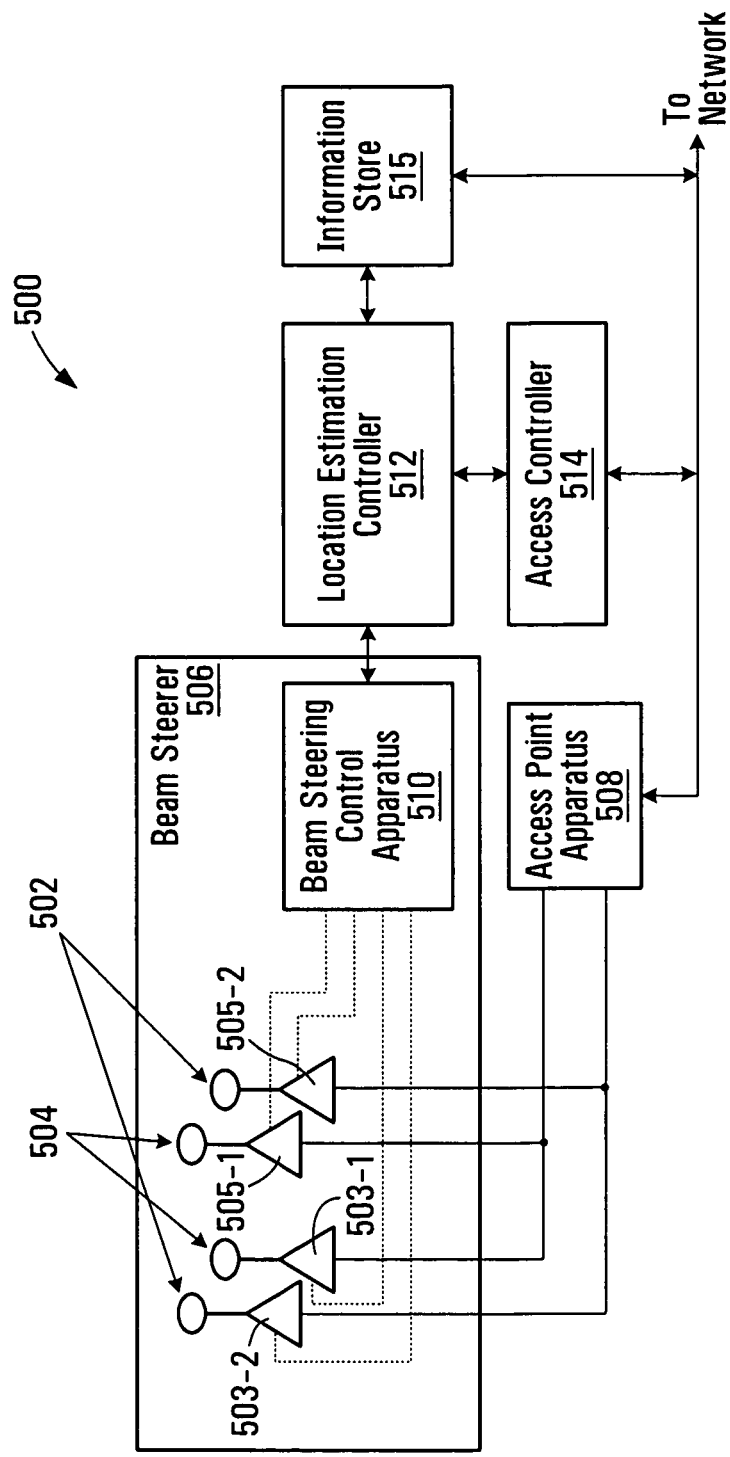
FIG. 5 is a block diagram of an example access point that might be used to implement some embodiments of the present application.

FIG. 5 is a block diagram of a wireless access point 500 in accordance with an embodiment of the present application. The access point 500 illustrated in FIG. 5 includes: a multi-beam antenna system that includes two dipole antennas generally indicated at 502 and 504; a beam steerer 506; access point apparatus 508 that includes a radio frequency (RF) transmitter (not shown); a location estimation controller 512; an access controller 514 and an information store 515.

The beam steerer 506 includes a beam steering control apparatus 510 that is functionally connected to the location estimation controller 512 and to control inputs of two pairs of variable phase shifter 503-1, 503-2 and 505-1, 505-2 that are respectively connected to inputs of the dipole antennas 502 and 504.

The access point apparatus 508 has two outputs: one output is connected to inputs of the phase shifters 503-1 and 505-1 and the other output is connected to inputs of the phase shifters 503-2 and 505-2.

The location estimation controller is functionally connected to the information store 515 and the access controller 514.

The access point apparatus 508, access controller 514 and the information store 515 are each functionally connected to a communication network (not shown).

The dipole antennas 502 and 504 are configured to generate a multi-beam antenna pattern.

The beam steerer 506 is configured to steer the antenna beams generated by the two dipole antennas 502 and 504 to a plurality of beaming angles.

The radio frequency (RF) transmitter in the access point apparatus 508 is configured to generate a plurality of wireless signals at each beaming angle of the plurality of beaming angles, such that at each beaming angle, each wireless signal of the plurality of wireless signals is transmitted on a respective one of the antenna beams of the multi-beam antenna pattern generated by the two dipole antennas 502 and 504.

The location estimation controller 512 is configured to estimate a bearing angle from a reference point of the multi-beam antenna pattern generated by the two dipole antennas 502 and 504 to a wireless terminal based on the plurality of beaming angles and a received signal property, measured at the wireless terminal, of each of the plurality of wireless signals transmitted on the respective antenna beams for each of the plurality of beaming angles.

In some embodiments, the access controller 514 and/or the information store 515 are not part of the access point 500, but rather are implemented in, for example, a network server that is in communication with the access point 500.

While the access point 500 illustrated in FIG. 5 includes two dipole antennas in order to generate a multi-beam antenna pattern that includes two antenna beams, more generally access points in accordance with embodiments of the present invention may include any number and type of antennas that are capable of generating a multi-beam antenna pattern.

In some embodiments, the location estimation controller 512 is configured to control the beam steerer 506 to steer a beam of the multi-beam antenna pattern toward a wireless terminal for communication with the wireless terminal based on the estimated bearing angle of the wireless terminal from the access point.

In some embodiments, location estimation controller 512 is configured to estimate a bearing angle from a reference point of the multi-beam antenna pattern generated by the two dipole antennas 502 and 504 to the wireless terminal by determining a beaming angle at which a ratio of the respective received signal property of the wireless signals transmitted on the respective antenna beams of the multi-beam antenna pattern is substantially equal to a predetermined value. In some cases the predetermined value may be determined by an initial calibration step, such as a "walk-test".

In some embodiments, the two dipole antennas are configured so that the first antenna beam and the second antenna beam generated by the antennas are separated by less than 90°. In some embodiments, the antenna beams generated by the antennas are separated by less than 45°. In some embodiments, the antenna beams are separated by 30° or less. In general, the antenna beams may be selected so that they are separated by any angle that provides some overlap of the antenna beams in a region in which it is desired to determine the location of wireless stations.

In some embodiments, the location estimation controller 512 is configured to receive an estimate of a bearing angle of a wireless terminal from another access point and the location estimation controller is configured to estimate a location of the wireless terminal based on a location of intersection of the estimated bearing angle of the wireless terminal from its own reference point and the estimated bearing angle of the wireless terminal from the reference point of the second access point.

The information store 515 may store estimated location information and identity information in respect of wireless terminals. It may also store information to assist the presentation of the location information in relation to the local scene, such as a map or floor plan. This information may be provided to a wireless terminal based on its estimated location and/or at the request of the wireless terminal or another application.

The access controller 514 is configured to control access of a wireless terminal to wireless communication system resources based on the estimated location of the wireless terminal determined by the location estimation controller 512. The access controller 514 may also contain a screening process that would be used to screen access to the access point (and its associated network) by wireless terminals based on their location in addition with other criteria such as account status or other identity information that may be stored in the information store 515 or elsewhere. Thus the access point may use the location estimate to allow access from a mobile guest transceiver in a public conference room, but exclude access from guest transceivers in other parts of the enterprise.

Some embodiments of the present application may provide an improved accuracy method for locating wireless terminals in a cluttered multi-path propagation environment. Such improved location information can provide the basis for additional services provided to the communications systems users, or for machine to machine communications and services. Some embodiments of the present invention do not require any additional apparatus in the wireless terminals (beyond that required to support standard radio system functions) and so may be provided at low cost. This may be of particular importance for machine to machine communications in low cost indoor environments. The invention may also be used to enable location restricted access to enterprise networks by visitors and staff. In some embodiments, the terminal drivers for this access control process could be included as part of an enterprise security solution.

Description of Example Components of a Communication System

Figure 6:
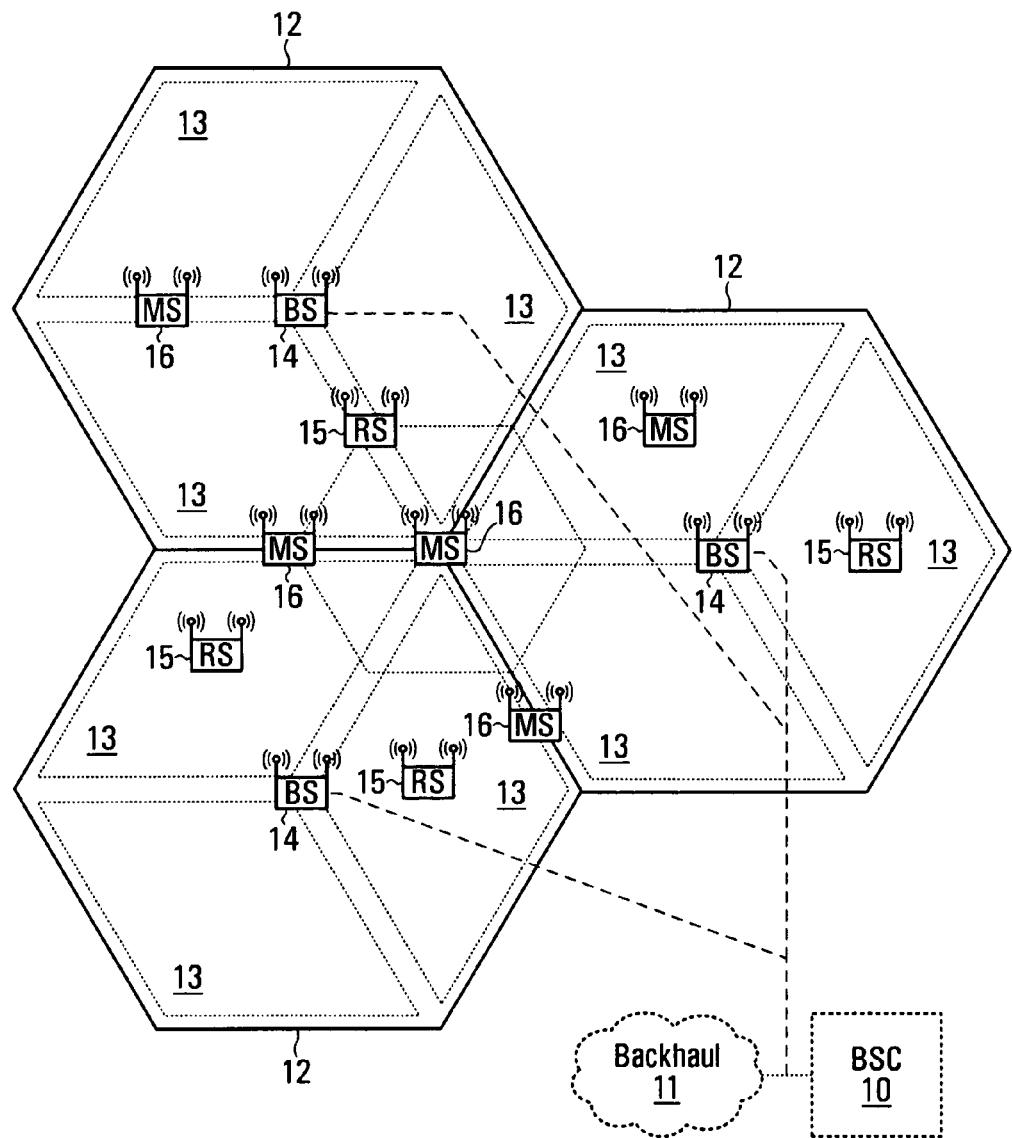
FIG. 6 is a block diagram of an example of a cellular communication system in which an embodiment of the present application might be implemented.

Referring now to FIG. 6, FIG. 6 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications with mobile and/or wireless terminals 16, which are within the cell 12 associated with the corresponding base station 14. The movement of the wireless terminals 16 in relation to the base stations 14 results in significant fluctuation in channel conditions. As illustrated, the base stations 14 and wireless terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each other and with another network (such as a core network or the internet, both not shown) over a backhaul network 11. In some configurations, a base station controller 10 is not needed.

Figure 7:
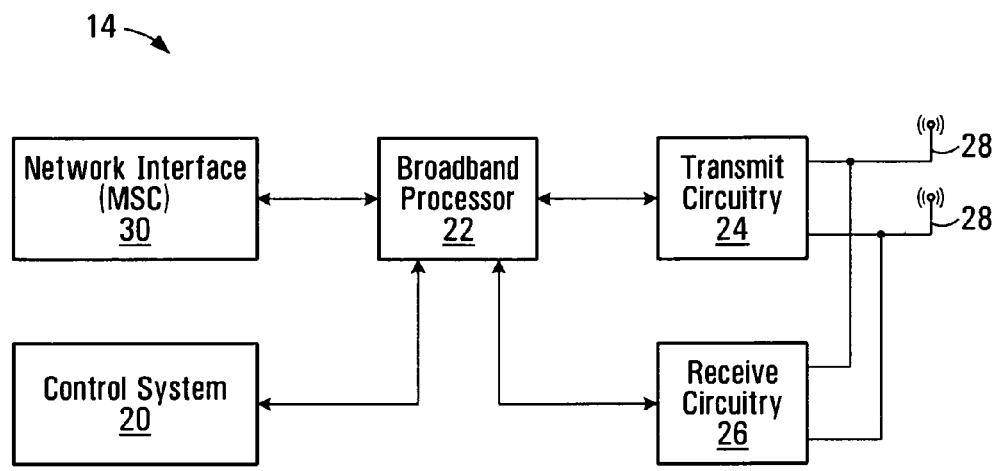
FIG. 7 is a block diagram of an example base station that might be used to implement some embodiments of the present application.

With reference to FIG. 7, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by wireless terminals 16 (illustrated in FIG. 8) and relay stations 15 (illustrated in FIG. 9). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another wireless terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Typically, duplexers and/or other apparatus (not shown) are used to connect the transmit circuitry 24 and the receive circuitry 26 to the antennas 28 and to keep the transmitted signals generated by the transmit circuitry 24 from "swamping" the receive circuitry 26. In some cases, a diversity approach may be used for reception and/or transmission, whereby a plurality of antennas are used to receive and/or transmit communication signals. Modulation and processing details are described in greater detail below.

Figure 8:
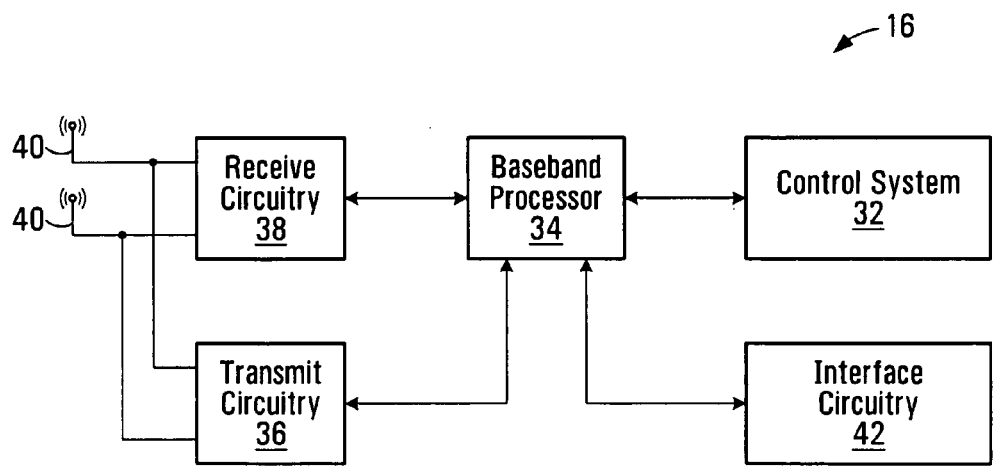
FIG. 8 is a block diagram of an example wireless terminal that might be used to implement some embodiments of the present application.

With reference to FIG. 8, an example of a wireless terminal 16 is illustrated. Similarly to the base station 14, the wireless terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the network interface 42 under the control of control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the wireless terminal and the base station, either directly or via the relay station.

Figure 9:
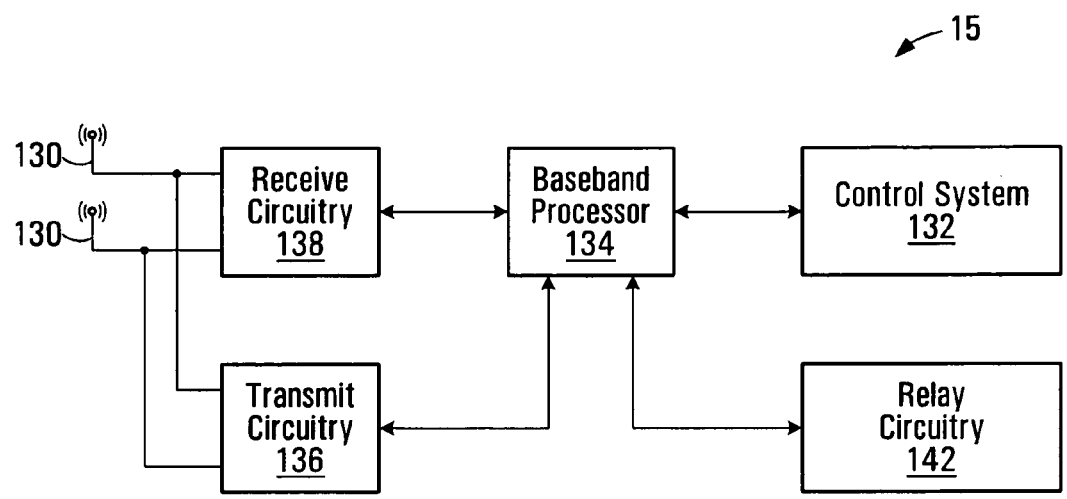
FIG. 9 is a block diagram of an example relay station that might be used to implement some embodiments of the present application.

With reference to FIG. 9, an example of a relay station 15 is illustrated. Similarly to the base station 14, and the wireless terminal 16, the relay station 15 will include a control system 132, a baseband processor 134, transmit circuitry 136, receive circuitry 138, multiple antennas 130, and relay circuitry 142. The relay circuitry 142 enables the relay 15 to assist in communications between a base station 14 and wireless terminals 16. The receive circuitry 138 receives radio frequency signals bearing information from one or more base stations 14 and wireless terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the wireless terminal and the base station, either directly or indirectly via a relay station, as described above.

It is important to note that the foregoing description of a relay station describes only one very specific example of a relay station that may be utilized in some embodiments of the present application. There are many other types that have different configuration and operations that might also be utilized in some embodiments of the present application.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. A method comprising:
   for each a plurality of beaming angles, transmitting, at an access point, a plurality of non-identical wireless signals on a respective plurality of partially overlapping antenna beams of a multi-beam antenna pattern substantially simultaneously;
   receiving, at the access point, a signal from a wireless station indicating the beaming angle at which a ratio of a respective received signal strength property of at least two of the substantially simultaneously transmitted non-identical wireless signals transmitted on respective antenna beams of the multi-beam antenna pattern is substantially equal to a predetermined value;
   determining, based on the beaming angle indicated in the signal received from the wireless station, a bearing angle, wherein the bearing angle is determined relative to a reference point of the access point to the wireless station, the bearing angle indicating a geographic coordinate of a location of the wireless station;
   determining a radial distance between the wireless station and the reference point of the access point, wherein the radial distance is determined based on at least one of a signal strength measurement and a timing advance calculation; and
   determining the location of the wireless station based on the determined bearing angle and the determined radial distance.

2. The method of claim 1, further comprising:
   steering a beam of the multi-beam antenna pattern toward the wireless station for communication with the wireless station based on the determined bearing angle of the wireless station.

3. The method of claim 1, wherein, for each of the plurality of substantially simultaneously transmitted wireless signals transmitted on the respective beams of the multi-beam antenna pattern, the received signal strength property at the wireless station comprises a received level of a component of the wireless signal transmitted on the respective beam that is distinct from components of the wireless signals transmitted on the other beams of the multi-beam antenna pattern.

4. The method of claim 3, wherein the predetermined value is substantially equal to one.

5. The method of claim 3, wherein:
   the multi-beam antenna pattern comprises a first antenna beam and a second antenna beam; and
   the signal from the wireless station indicates a beaming angle at which a ratio of the received signal strength property of the respective substantially simultaneously transmitted wireless signal transmitted on the first antenna beam to the received signal strength property of the respective substantially simultaneously transmitted wireless signal transmitted on the second antenna beam is substantially equal to the predetermined value.

6. The method of claim 5, wherein:
   the multi-beam antenna pattern comprises a third antenna beam intermediate the first antenna beam and the second antenna beam; and
   the signal from the wireless station indicates a beaming angle at which:
   a ratio of the received signal strength property of the respective substantially simultaneously transmitted wireless signal transmitted on the first antenna beam to the received signal strength property of the respective substantially simultaneously transmitted wireless signal transmitted on the third antenna beam is substantially equal to a second predetermined value; and
   a ratio of the received signal strength property of the respective substantially simultaneously transmitted wireless signal transmitted on the second antenna beam to the received signal strength property of the respective substantially simultaneously transmitted wireless signal transmitted on the third antenna beam is substantially equal to a third predetermined value.

7. The method of claim 6, wherein the third antenna beam is substantially half-way between the first antenna beam and the second antenna beam, and the second predetermined value is substantially equal to the third predetermined value.

8. The method of claim 3, further comprising:
   for each beaming angle, transmitting, to the wireless station, a code representative of the beaming angle.

9. The method of claim 8, wherein:
   the signal received at the access point from the wireless station comprises the code representative of the beaming angle at which the ratio of the respective received signal strength property of at least two of the substantially simultaneously transmitted wireless signals transmitted on respective antenna beams of the multi-beam antenna pattern is substantially equal to the predetermined value.

10. The method of claim 3, wherein the plurality of substantially simultaneously transmitted wireless signals comprises anyone of:
    orthogonal frequency division multiplex (OFDM) signals;
    code division multiple access (CDMA) signals;
    time division multiple access (TDMA) signals; and
    pulse-based ultra wideband (UWB) signals.

11. The method of claim 1, further comprising:
    for each of at least one additional access point:
    for each of a plurality of beaming angles of the additional access point, transmitting a plurality of wireless signals substantially simultaneously on respective antenna beams of an additional multi-beam antenna pattern, wherein the plurality of substantially simultaneously transmitted wireless signals transmitted on respective antenna beams of the additional multi-beam antenna pattern are non-identical; and
    determining a bearing angle from a reference point of the additional access point to the wireless station based on a received signal strength property, at the wireless station, of each of the plurality of substantially simultaneously transmitted wireless signals transmitted on the respective beams of the additional multi-beam antenna pattern.

12. The method of claim 11, wherein:
estimating the location of the wireless station is further based on a location of intersection of the determined bearing angle of the wireless station from the reference point of the first access point and the respective determined bearing angles of the wireless station from the respective reference points of each of the at least one additional access point.

13. The method of claim 12, further comprising:
determining, with a location estimation controller at the access point, a radial distance between the wireless station and the reference point of each of the at least one additional access point, wherein determining the location of the wireless station is determined based on the location of intersection of the determined bearing angles of the wireless station from the respective reference points of at least a subset of the plurality of access points and hyperbolas representing determined radial distances between the wireless station and the respective reference points of at least the subset of the plurality of access points.

14. An apparatus for a wireless communications access point comprising:
a multi-beam antenna system configured to generate a multi-beam antenna pattern having a plurality of partially overlapping antenna beams;
a beam steerer configured to steer the multi-beam antenna system to a plurality of beaming angles;
a radio frequency (RF) transmitter configured to generate a plurality of wireless signals at each beaming angle of the plurality of beaming angles, such that at each beaming angle, each wireless signal of the plurality of wireless signals is transmitted on a respective one of the antenna beams of the multi-beam antenna pattern generated by the multi-beam antenna system, wherein for each beaming angle, the plurality of wireless signals transmitted on the plurality of antenna beams of the multi-beam antenna pattern are transmitted substantially simultaneously and are non-identical; and
a location estimation controller configured to:
receive a signal from a wireless station indicating the beaming angle at which a ratio of a respective received signal strength property of at least two of the substantially simultaneously transmitted non-identical wireless signals transmitted on respective antenna beams of the multi-beam antenna pattern is substantially equal to a predetermined value;
determine, based on the beaming angle indicated in the signal received from the wireless station, a bearing angle, wherein the bearing angle is determined relative to a reference point of the access point to the wireless, the bearing angle indicating a geographic coordinate of a location of the wireless station;
determine a radial distance between the wireless station and the reference point of the access point, wherein the radial distance is determined based on at least one of a signal strength measurement and a timing advance calculation; and
determine the location of the wireless station based on the determined bearing angle and the determined radial distance.

15. The apparatus of claim 14, wherein the RF transmitter is configured to transmit a code representative of a current beaming angle of the plurality of beaming angles for each of the plurality of beaming angles.

16. The apparatus of claim 15, wherein the signal from the wireless station comprises the code representative of the beaming angle at which the ratio of the respective received signal strength property of at least two of the substantially simultaneously transmitted wireless signals transmitted on respective antenna beams of the multi-beam antenna pattern is substantially equal to the predetermined value.

* * * * *